(12) United States Patent
Webb

(10) Patent No.: US 9,322,572 B2
(45) Date of Patent: *Apr. 26, 2016

(54) ENVIRONMENTALLY FRIENDLY FUEL GAS WITHIN A REFILLABLE AND NON-CORROSIVE GAS CYLINDER

(71) Applicant: John Earl Webb, Apple Valley, MN (US)

(72) Inventor: John Earl Webb, Apple Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/286,633

(22) Filed: May 23, 2014

(65) Prior Publication Data
US 2014/0251838 A1 Sep. 11, 2014

Related U.S. Application Data

(62) Division of application No. 13/462,444, filed on May 2, 2012, now Pat. No. 8,733,543.

(60) Provisional application No. 61/485,225, filed on May 12, 2011.

(51) Int. Cl.
*C01B 3/00* (2006.01)
*F24H 9/02* (2006.01)
(Continued)

(52) U.S. Cl.
CPC .. *F24H 9/02* (2013.01); *C01B 3/00* (2013.01); *F17C 1/005* (2013.01); *F17C 3/00* (2013.01); *F17C 2201/0109* (2013.01); *F17C 2201/0119* (2013.01); *F17C 2201/0123* (2013.01); *F17C 2201/0128* (2013.01); *F17C 2201/0157* (2013.01); *F17C 2201/052* (2013.01); *F17C 2201/058* (2013.01); *F17C 2203/012* (2013.01); *F17C 2203/013* (2013.01); *F17C 2203/0617* (2013.01); *F17C 2203/0636* (2013.01);
(Continued)

(58) Field of Classification Search
CPC ........... F24H 9/02; F23D 14/28; F23D 14/38; F17C 1/00; C01B 3/00
USPC .......... 126/263.01, 39 E, 110 R; 44/300, 628; 206/0.6; 431/344; 53/403
See application file for complete search history.

(56) References Cited

U.S. PATENT DOCUMENTS 1,628,067 A 5/1927 Rose
2,563,460 A 8/1951 Faber
(Continued)

FOREIGN PATENT DOCUMENTS

CN 102102042 6/2011
JP 52132004 11/1977
(Continued)

OTHER PUBLICATIONS

Gaydon, The Spectroscopy of Flames, J. Wiley & Sones, NY, 1957, 100-103.
(Continued)

*Primary Examiner* — Gregory Huson
*Assistant Examiner* — Nikhil Mashruwala
(74) *Attorney, Agent, or Firm* — Fish & Richardson P.C.

(57) ABSTRACT

An article is provided that can be used as a heating source for various applications. The article includes an environmentally friendly gaseous fuel mixture within a gas cylinder that is both non-corrosive and refillable. More specifically, the gaseous fuel mixture contains hydrogen and methane. Methods of using the article as a heating source are also provided.

20 Claims, 1 Drawing Sheet

(51) Int. Cl.
*F17C 1/00* (2006.01)
*F17C 3/00* (2006.01)

(52) U.S. Cl.
CPC . *F17C2203/0643* (2013.01); *F17C 2203/0646* (2013.01); *F17C 2203/0648* (2013.01); *F17C 2205/0329* (2013.01); *F17C 2209/221* (2013.01); *F17C 2209/232* (2013.01); *F17C 2221/012* (2013.01); *F17C 2221/03* (2013.01); *F17C 2221/033* (2013.01); *F17C 2223/0123* (2013.01); *F17C 2223/0161* (2013.01); *F17C 2223/033* (2013.01); *F17C 2260/011* (2013.01); *F17C 2260/013* (2013.01); *F17C 2260/016* (2013.01); *F17C 2260/042* (2013.01); *F17C 2265/027* (2013.01); *F17C 2270/0105* (2013.01); *F17C 2270/0113* (2013.01); *F17C 2270/0123* (2013.01); *F17C 2270/0136* (2013.01); *F17C 2270/0709* (2013.01); *Y10T 29/49826* (2015.01)

(56) References Cited

U.S. PATENT DOCUMENTS

| | | | |
|---|---|---|---|
| 3,713,793 | A | 1/1973 | Maruyama |
| 5,429,267 | A | 7/1995 | San |
| 6,105,777 | A | 8/2000 | Castellarin et al. |
| 6,263,902 | B1 | 7/2001 | Booth |
| 6,670,570 | B2 | 12/2003 | Giacobbe |
| 7,770,545 | B2 | 8/2010 | Morgenstern |
| 7,811,688 | B2 | 10/2010 | Flynn et al. |
| 8,021,448 | B2 * | 9/2011 | Zhu .............. B01J 19/088 204/157.4 |
| 8,070,835 | B2 | 12/2011 | McAlister |
| 8,091,536 | B2 | 1/2012 | Munshi |
| 9,193,925 | B2 * | 11/2015 | McAlister ............ C10L 1/02 |
| 2004/0245680 | A1 | 12/2004 | Wakeman et al. |
| 2005/0168002 | A1 | 8/2005 | Herring |
| 2012/0037146 | A1 * | 2/2012 | Platvoet ............ F23D 14/10 126/39 E |
| 2012/0285839 | A1 | 11/2012 | Webb |

FOREIGN PATENT DOCUMENTS

| | | |
|---|---|---|
| JP | 58083093 | 5/1983 |
| JP | 59219391 | 12/1984 |
| JP | 2003-129072 | 5/2003 |
| JP | 2007-070640 | 3/2007 |

OTHER PUBLICATIONS

Kondratieva, "Investigations of the Flame of CO and $O_2$," *Acta Physiochimica U.R.S.S.*, 1936, 4:625-636.

* cited by examiner

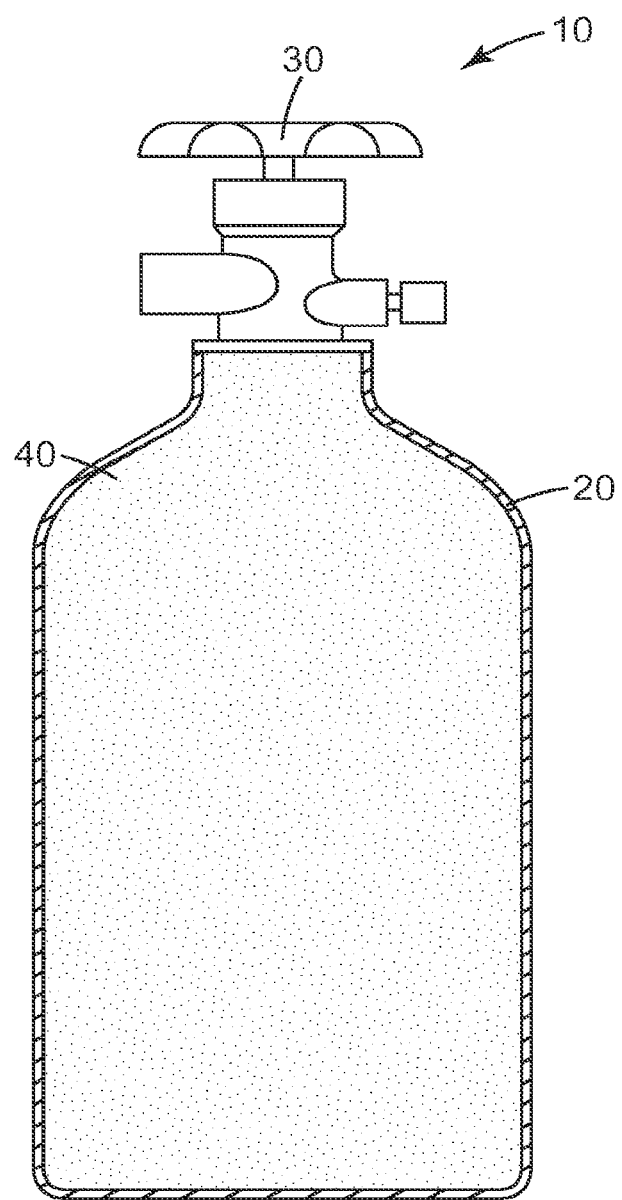

US 9,322,572 B2

ENVIRONMENTALLY FRIENDLY FUEL GAS WITHIN A REFILLABLE AND NON-CORROSIVE GAS CYLINDER

CROSS-REFERENCE TO RELATED APPLICATIONS

This application is a divisional application of U.S. patent application Ser. No. 13/462,444, filed May 2, 2012 (now U.S. Pat. No. 8,733,543), which claims the benefit of U.S. Provisional Application Ser. No. 61/485,225, filed 12 May 2011, May 12, 2011. The disclosures of the prior applications are considered part of (and are incorporated by reference in) the disclosure of this application.

TECHNICAL FIELD

The present invention relates to articles that can be used as a heating source and methods of heating. The articles include a non-corrosive, refillable gas cylinder containing a gaseous fuel mixture.

BACKGROUND OF THE INVENTION

Gas cylinders containing a compressed fuel gas are commercially available in a variety of sizes that can be used as a source of heat (i.e., heating source). Gas cylinders that are of a portable size are often not reusable (i.e., refillable). After the compressed fuel gas has been used as a heating source, the gas cylinders can present an environmental hazard if they are not disposed of properly. More specifically, the gas cylinders often contain some residual fuel (i.e., residual compressed gas) inside after normal use. If the gas cylinders undergo corrosion, the residual fuel can be released. This release can pose both an environmental problem and a potential fire or explosion hazard.

Fuel gases are often used to heat metal in various metallurgical applications. One commonly used fuel gas for fusion welding and brazing is acetylene. Acetylene has a number of drawbacks as a fuel gas, particularly for use in portable gas cylinders. It is explosive if the pressure exceeds about 15 pounds per square inch (psi). For this reason, acetylene is usually dissolved in acetone or another organic solvent to improve its stability. Further, various porous filler materials are typically placed in gas cylinders used with acetylene to further improve stability. The addition of these porous materials can adversely impact the total weight of the gas cylinder containing acetylene. Further, addition of these porous materials can create a disposal problem because the used porous materials may be considered a hazardous waste.

SUMMARY OF THE INVENTION

An article is provided that can be used, when combined with an oxygen-containing gas, as a heating source for various applications, particularly for non-welding metallurgical applications. The article includes a gas cylinder containing an environmentally friendly gaseous fuel mixture. The gas cylinders are both non-corrosive and refillable. More specifically, the gaseous fuel mixture contains hydrogen and methane. Methods of using the article as a heating source are also provided.

In a first aspect an article is provided that includes a gaseous fuel mixture and a refillable gas cylinder. The gaseous fuel mixture comprises (a) hydrogen in an amount in a range of 30 to 95 volume percent based on a total volume of the gaseous fuel mixture and (b) methane in an amount in a range of 5 to 70 weight percent based on the total volume of the gaseous fuel mixture. The gas cylinder has (a) a non-corrosive container and (b) a valve that is connected to the non-corrosive container and that is suitable for use with a hydrogen-containing gas. The gaseous fuel mixture is positioned within the non-corrosive container of the gas cylinder.

In a second aspect, a heating method is provided that can be environmentally friendly. The method includes providing a refillable gas cylinder having a non-corrosive container and a valve that is connected to the non-corrosive container and that is suitable for use with a hydrogen-containing gas. The method further includes at least partially filling the non-corrosive container of the gas cylinder with a gaseous fuel mixture that contains both hydrogen and methane. Hydrogen is present in the gaseous fuel mixture in an amount in a range of 30 to 95 volume percent based on a total volume of the gaseous fuel mixture. Methane is present in the gaseous fuel mixture in an amount in a range of 5 to 70 volume percent based on the total volume of the gaseous fuel mixture. The method still further includes supplying a heating source, wherein supplying includes discharging at least a portion of the gaseous fuel mixture from the non-corrosive container through the valve and combining the gaseous fuel mixture with an oxygen-containing gas. After discharging, the method yet further includes adding additional gaseous fuel mixture to the non-corrosive container through the valve.

In a third aspect, an article is provided that includes a gaseous fuel mixture and a refillable gas cylinder. The gaseous fuel mixture comprises (a) hydrogen in an amount in a range of 70 to 95 volume percent based on a total volume of the gaseous fuel mixture, (b) methane in an amount in a range of 5 to 30 weight percent based on the total volume of the gaseous fuel mixture, and (c) a mercaptan compound in an amount less than 0.1 to 100 parts per million (volume/volume). The gas cylinder has (a) a non-corrosive container comprising aluminum and (b) a valve that is connected to the non-corrosive container and that is suitable for use with a hydrogen-containing gas. The gaseous fuel mixture is positioned within the non-corrosive container of the gas cylinder.

BRIEF DESCRIPTION OF THE DRAWINGS

Embodiments of the invention are described by way of example, with reference to the accompanying drawings, in which:

FIG. 1 shows a schematic drawing of an exemplary embodiment of a refillable and non-corrosive gas cylinder containing a gaseous fuel mixture.

DETAILED DESCRIPTION

An article is provided that can be used as a heating source when combined with an oxygen-containing gas. Additionally, a heating method is provided using the articles described herein. The article and method can overcome many of the environmental issues associated with current portable heating sources and, in particular, those associated with the use of acetylene gas. The article and method are particularly useful for various non-welding metallurgical applications.

In a first aspect an article is provided that include a gaseous fuel mixture and a refillable gas cylinder. The gaseous fuel mixture comprises (a) hydrogen in an amount in a range of 30 to 95 volume percent based on a total volume of the gaseous fuel mixture and (b) methane in an amount in a range of 5 to 70 weight percent based on the total volume of the gaseous fuel mixture. The gas cylinder has (a) a non-corrosive container and (b) a valve that is connected to the non-corrosive container and that is suitable for use with a hydrogen-containing gas. The gaseous fuel mixture is positioned within the non-corrosive container of the gas cylinder.

FIG. 1 is a schematic drawing of one such article. The article includes a gas cylinder 10 that includes both the non-corrosive container 20 and a valve 30 that is connected to the non-corrosive container 20. The gaseous fuel mixture 40 is positioned within the non-corrosive container 20. The gaseous fuel mixture can be charged into the non-corrosive container 20 of the gas cylinder 10 and discharged from the gas cylinder 10 through the valve 30.

The gaseous fuel mixture, which can be used as a source of heat when combined with an oxygen-containing gas, contains a mixture of hydrogen and methane. When used as a heating source, the gaseous fuel mixture combusts in the presence of oxygen to produce carbon dioxide and water. There are few, if any, other combustion products. That is, the gaseous fuel mixture burns cleanly in the presence of oxygen. Both the gaseous fuel mixture and the combustion products are naturally present in the atmosphere and pose few, if any, environmental or health concerns. Stated differently, both the gaseous fuel mixture and its reaction products do not contaminate water, soil, or the atmosphere.

The gaseous fuel mixture typically contains 30 to 95 volume percent hydrogen and 5 to 70 volume percent methane based on a total volume of the gaseous fuel mixture. If a lower amount of methane is included in the gaseous fuel mixture, a well formed flame can be difficult to obtain in the presence of oxygen. That is, the flame formed after mixing of the gaseous fuel mixture with an oxygen-containing gas can lift away from the tip of a torch. Such a flame is difficult to control or use effectively in many applications. On the other hand, if a higher amount of methane is included in the gaseous fuel mixture, the cost of the gaseous fuel mixture tends to increase and the amount of carbon dioxide formed in the combustion products increases.

In some embodiments, the gaseous fuel mixture contains 40 to 95 weight percent hydrogen and 5 to 60 weight percent methane or 45 to 95 weight percent hydrogen and 5 to 55 weight percent methane. In some more specific embodiments, it can be advantageous to have at least 50 weight percent hydrogen in the gaseous fuel mixture. That it, some embodiments have 50 to 95 weight percent hydrogen and 5 to 50 weight percent methane, 60 to 95 volume percent hydrogen and 5 to 40 volume percent methane, 65 to 95 volume percent hydrogen and 5 to 35 volume percent methane, 70 to 95 volume percent hydrogen and 5 to 30 volume percent methane, 75 to 95 volume percent hydrogen and 5 to 25 volume percent methane, 80 to 95 volume percent hydrogen and 5 to 20 volume percent methane, 85 to 95 volume percent hydrogen and 5 to 15 volume percent methane, or 87 to 93 volume percent hydrogen and 7 to 13 volume percent methane. Some particular gaseous fuel mixtures contain about 90 volume percent hydrogen and 10 volume percent methane.

The hydrogen in the gaseous fuel mixture can be from any suitable source and can have any desired purity. Hydrogen is often a by-product produced when refining propane. The purity can be dependent on the particular application. The purity for hydrogen is often selected to be at least 99.95 percent pure, at least 99.99 percent pure, at least 99.995 percent pure, or at least 99.999 percent pure. Standard industrial grade hydrogen, which usually has a purity of at least 99.95 percent, can contain, for example, up to 10 parts per million (volume/volume) carbon dioxide, up to 10 parts per million (volume/volume) carbon monoxide, up to 10 parts per million (volume/volume) oxygen, up to 400 parts per million (volume/volume) nitrogen, and up to 34 parts per million (volume/volume) water. Hydrogen is commercially available in different purity levels from multiple suppliers.

The methane in the gaseous fuel mixture can be from any suitable source and can have any desired purity. Methane is a by-product of refining petroleum and can be found naturally. The purity for methane is often selected to be at least 99.0 percent pure, at least 99.9 percent pure, at least 99.97 percent pure, or at least 99.99 percent pure. Methane that is at least 99.0 percent pure, which is often referred to as a chemically pure grade, can contain impurities such as, for example, up to 150 parts per million (volume/volume) ethane, up to 5000 parts per million (volume/volume), up to 150 parts per million (volume/volume) oxygen, up to 150 parts per million (volume/volume) other hydrocarbons, and up to 3 parts per million (volume/volume) water. Methane is commercially available in different purity levels from multiple suppliers.

The gaseous fuel mixture containing both hydrogen and methane typically has less than 1000 parts per million (volume/volume) carbon monoxide and less than 1000 parts per million (volume/volume) carbon dioxide. The presence of either of these gases can result in the formation of a caustic environment when the gaseous fuel mixture is used as a heating source. Low levels of carbon monoxide are desired because of its toxicity. In many embodiments, the concentration of both carbon monoxide and carbon dioxide in the gaseous fuel mixture is less than 500 parts per million (volume/volume), less than 200 parts per million (volume/volume), less than 100 parts per million (volume/volume), less than 50 parts per million (volume/volume), less than 20 parts per million (volume/volume), or less than 10 parts per million (volume/volume).

A mercapto-containing compound may be added to the gaseous fuel mixture to provide an odor sufficient to alert humans nearby of the presence of the gaseous fuel mixture. This can be helpful, for example, if a leak develops in the gas cylinder used to store the gaseous fuel mixture or if the valve of the gas cylinder is accidently opened or left opened. Any suitable mercapto-containing compound can be used. The strength of the odor of these compounds is typically related to their molecular weight. That is, mercapto-containing compounds of lower molecular weight tend to be more volatile. In some embodiments, the mercaptan-containing compound is an alkyl mercaptan with the alkyl group having 1 to 10 carbon atoms, 1 to 6 carbon atoms, 1 to 4 carbon atoms, 1 to 3 carbon atoms, or 1 to 2 carbon atoms. Some specific alkyl mercaptan compounds include methyl mercaptan and ethyl mercaptan.

The human detection of many alkyl mercaptan compounds such as methyl mercaptan can be less than 1 parts per million (volume/volume). Thus, only a small amount of the mercapto-containing compound such as an alkyl mercaptan is needed in the gaseous fuel mixture to provide an alert. The gaseous fuel mixture can contain up to 100 part per million (volume/volume) mercapto-containing compound based on the total volume of the gaseous fuel mixture. For example, the mercapto-containing compound can be present in an amount up to 80 parts per million (volume/volume), up to 75 parts per million (volume/volume), up to 50 parts per million (volume/volume), up to 25 parts per million (volume/volume), up to 20 parts per million (volume/volume), or up to 10 parts per million (volume/volume). In some examples, the mercapto-containing compound is present in an amount in a range of 0.1 to 100 parts per million (volume/volume), a range of 0.1 to 50 parts per million (volume/volume), in a range of 0.1 to 25 parts per million (volume/volume), in a range of 0.1 to 20 parts per million (volume/volume), in a range of 1 to 20 parts per million (volume/volume), in a range of 0.1 to 10 parts per million (volume/volume), in a range of 1 to 10 parts per million (volume/volume), in a range of 0.1 to 5 parts per million (volume/volume), in a range of 1 to 5 parts per million (volume/volume), in a range of 0.1 to 2 parts per million (volume/volume), in a range of 0.1 to 1 parts per million (volume/volume), in a range of 0.1 to 0.5 parts per million (volume/volume), or in a range of 0.1 to 0.2 parts per million (volume/volume).

The gaseous fuel mixture can be obtained from PRO-CYL LLC under the trade designation HYDRO MIX.

The gaseous fuel mixture is typically free or essentially free of various organic solvents such as, for example, acetone, dimethyl formamide, N-methylpyrrolidinone, or mixtures thereof. These solvents are typically used with acetylene fuels but are not needed for the gaseous fuel mixtures described herein. When used in reference to acetylene or to organic solvents typically present when acetylene is used as a fuel gas, the term "essentially free" means less than 2 volume percent, less 1 volume, less than 0.5 volume percent, less than 0.1 volume percent (1000 parts per million), less than 0.05 volume percent (500 parts per million), less than 0.01 volume percent (100 parts per million), less than 50 parts per million (volume/volume), or less that 20 parts per million (volume/volume) based on a total weight of the gaseous fuel mixture. Depending on the purity of the methane used in the gaseous fuel mixture, there can be trace levels of other hydrocarbons present.

The contents within the non-corrosive container are typically free or essentially free of various solid filler materials such as various stabilizers such a diatomaceous earth, cellulosic wood fiber, and the like. No solid reactants are present in the gas cylinders for the production of the gaseous fuel mixture. As used herein in reference to filler materials, the term "essentially free" means less than 2 percent by weight, less than 1 percent by weight, less than 0.5 percent by weight, less than 0.1 percent by weight, less than 0.05 percent by weight, or less than 0.001 percent by weight based on a total weight of the contents within the non-corrosive container. Stated differently, the stabilizers needed with other commonly used heating sources such as acetylene are not included in the current gaseous fuel mixtures and typically are not present within the non-corrosive gas cylinder. This is particularly advantageous because the amount of residual gas remaining in a spent gas cylinder can be less in the absence of the stabilizers. Additionally, the absence of the solid filler materials can lighten the weight of the article considerably. For example a gas cylinder having a diameter of about 6.9 inches (17.5 cm) and a length of about 33.1 inches (84.1 cm) that is filled with the gaseous fuel mixture described herein typically weighs in a range of 15 to 20 pounds. A comparably sized gas cylinder filled with acetylene weighs about twice this amount.

The gaseous fuel mixture is provided within a gas cylinder for use as a heating source. The gas cylinder is both refillable and non-corrosive. The gas cylinder includes both a non-corrosive container and a valve that is connected to the non-corrosive container. The valve is suitable for use with a hydrogen-containing gas and suitable for refilling. The gaseous fuel mixture is placed within the non-corrosive container.

Although any suitable gas cylinder could be used, it is highly desirable to provide a heating source that is environmentally friendly. One aspect of being environmentally friendly is using gas cylinders that are refillable. Many commonly available gas cylinders, particularly those available for use as portable heating sources (e.g., those weighing less than 10 pounds, less than 5 pounds, or less than 1 pound) such as those commonly used for propane and propylene, are not refillable. After use, the non-refillable gas cylinders are typically disposed of in a land fill or other disposal site. Refillable gas cylinders can be advantageously used to reduce the amount of solid waste generated through the use of the gaseous fuel mixture.

Another aspect of being environmentally friendly is using a gas cylinder that is non-corrosive (i.e., not corrodible under typical use conditions). Many commonly used gas cylinders are constructed of metals such as carbon steel that can undergo corrosion. Corrosion may be caused from the outside of the gas cylinder, through contact with water, salts, carbon dioxide, and the like. Corrosion of the gas cylinders can be a problem aesthetically. More importantly, however, when corrosion occurs, any residual fuel within the gas cylinders can leach into the soil and/or groundwater creating environmental concerns. Corroded gas cylinders have been associated with explosions. That is, the residual gas in the gas cylinders can leak out of the gas cylinders and react violently upon exposure to air or upon exposure to other chemicals that may be present in the environment.

The amount of gas cylinder corrosion is typically controlled by providing an outer coating to protect a corrodible metal (i.e., a metal that can undergo corrosion under typical use conditions). That is, the outer coating reduces the likelihood of corrosion by minimizing exposure of the surface of the gas cylinder's corrodible portions to an oxidizing environment. This outer coating can be, for example, a layer of paint or a layer of a polymeric material. The outer coating is typically selected to be tough or resistant to removal when scratched or bumped. Although the outer coating can reduce corrosion, such coatings rarely totally prevent corrosion because, over time, portions of the outer coating are removed through use and the metal becomes exposed.

Thus, the gaseous fuel mixture described herein is provided within a gas cylinder constructed out of non-corrosive materials (i.e., metals that do not undergo corrosion under typical use conditions although an oxidized layer may be present on the outer surface). Any metal or metal alloy can be selected that is non-corrosive and that can be fabricated for use as a gas cylinder. The non-corrosive container of the gas cylinder can be fabricated, for example, from stainless steel, nickel or a nickel alloy, titanium or a titanium alloy, or aluminum or an aluminum alloy. In practice, however, aluminum or an aluminum alloy is typically selected based on cost considerations. In addition to be non-corrosive, gas cylinders fabricated from aluminum or an aluminum alloy tend to be significantly lighter than comparably sized gas cylinders fabricated from carbon steel. For example, gas cylinders of aluminum tend to be 40 to 60 percent lighter than comparably sized gas cylinders of carbon steel. Aluminum can be used to provide a gas cylinder that is non-corrosive, lightweight, recyclable, strong, and economical.

The gaseous fuel mixture is typically introduced into the non-corrosive (i.e., non-corrodible) container of the gas cylinder through the valve. When used as a heating source, the gaseous fuel mixture is discharged through the same valve and combined with oxygen. After discharging at least a portion of the gaseous fuel mixture from the non-corrodible container, additional gaseous fuel mixture can be introduced into the non-corrodible container through the valve.

The gas cylinder can have any desired size. Most of the gas cylinders have a length that is greater than the diameter. The diameter can be, for example, at least 7.6 cm (3 inches), at least 10.2 cm (4 inches), or at least 12.7 cm (5 inches) and can extend up to 25.4 cm (10 inches), up to 17.8 cm (7 inches), up to 22.9 cm (9 inches), or even more. For example, the diameter can be in a range of 7.6 to 25.4 cm (3 to 10 inches), in a range of 7.6 to 20.3 cm (3 to 8 inches), or in a range of 7.6 to 15.2 cm (3 to 6 inches). The length can be up to 152.4 cm (60 inches) or even longer, up to 127 cm (50 inches), up to 101.6 cm (40 inches), or up to 76.2 cm (30 inches). The length is often at least 20.3 cm (8 inches), at least 25.4 cm (10 inches), at least 30.5 cm (12 inches), or at least 38.1 cm (15 inches). For example, the length can be in a range of 20.3 to 152.4 cm (8 to 60 inches), in a range of 229.5 to 140 cm (9 to 55 inches), in a range of 25.4 to 127 cm (10 to 50 inches), or in a range of 25.4 to 101.6 cm (10 to 40 inches). Some cylinders have a diameter of 7.6 cm (3 inches) to 15.2 cm (6 inches) such as, for example, those referred to in the industry as MC cylinders and B cylinders. Suitable gas cylinders such as those constructed of aluminum or an aluminum alloy can be obtained, for example, from CYL-TEC of Aurora, Ill.

In some embodiments, the gas cylinder filled with the gaseous fuel mixture is light enough to be carried by hand. In other embodiments, the cylinders must be transported using a cart and can be moved easily from one location to another for use. In still other embodiments, one or more gas cylinders can be positioned at a first location and the gaseous fuel mixture is transferred to a second location of use through a system of pipes or flexible tubing. For example, group of gas cylinders (e.g., 6 gas cylinders or 12 gas cylinders) containing the gaseous fuel mixture can be connected together through a manifold at a first location and then transferred through a system of pipes or flexible tubing to the second location. As another example, a plurality of gas cylinders containing the gaseous fuel mixture can be stored on a trailer such as a truck trailer and the gaseous fuel mixture can be transferred from the trailer to the use location through a system of pipes of flexible tubing to the second location.

The gas cylinder includes a valve that is suitable for use with a hydrogen-containing gas. This valve is often fitted with reverse threads (i.e., left-handed threads) and with a pressure-release feature. The gas fuel mixture is introduced and discharged through this valve. The valve functions as an on/off valve and as a course regulator of the flow rate.

The non-corrosive container of the gas cylinder can be filed with any suitable amount of the gaseous fuel mixture. The initial pressure is typically selected based on the specifications for the particular gas cylinder and depends on such factors as the cylinder size, thickness of the walls of the container, and the specific composition of the gaseous fuel mixture. The pressure of filling the gaseous fuel mixture depends upon the capacity of the container. For example, the initial pressure can be at least 10,340 kPa (1500 psi), at least 13,790 kPa (2000 psi), at least 15,278 kPa (2216 psi), at least 17,237 kPa (2500 psi), or at least 20,684 kPa (3000 psi). If the gas cylinder is constructed of aluminum or an aluminum alloy, the initial pressure is often close to 15,278 kPa (2216 psi). Other than a mercapto-containing compound and trace impurities that may be present in the hydrogen and the methane, no other compound or material is typically added to the gas cylinders besides hydrogen and methane.

A gas flow regulator is typically added to the exit side of the valve (i.e., the side of the valve that is not directly connected to the gas cylinder) and is used to better control the flow rate of the gaseous fuel mixture discharged from the gas cylinder. Suitable regulators include, for example, those commercially available under the trade designation CGA 350 from various suppliers.

A torch is often added on the exit side of the regulator (i.e., the side of the regulator that is opposite the valve of the gas cylinder). That is, the regulator has a first end that is connected to the valve and a second end that is connected to the torch. A flexible hose, such as those commonly used in the welding industry, is typically used to join the torch to the regulator. The torch and, in particular, the torch tip are often selected based on the particular use of the gaseous fuel mixture as a heating source. The torch is usually configured to mix the gaseous fuel mixture with an oxygen-containing source (e.g., ambient air, compressed air, or compressed oxygen). Torches may include additional optional safety features such as check valves that allow flow in a single direction.

The oxygen combined with the gaseous fuel mixture to provide both a flame and heat can be a component of atmospheric air or can be provided as a compressed gas (e.g., air or oxygen) in another gas cylinder. Usually, the oxygen is supplied from another gas cylinder that is connected to the torch through a regulator and a flexible hose such as those commonly used in the welding industry. Torches connected to compressed oxygen cylinders often provide a higher temperature flame than those produced using atmospheric air as the oxidant. That is, a higher temperature flame can result from the combustion of the gaseous fuel mixture with oxygen rather than air. Stated differently, the concentration of oxygen mixed with the gaseous fuel mixture can be used to regulate the temperature of the flame. The flame can be an oxidizing flame when the amount of oxygen exceeds the amount of the gaseous fuel mixture, can be a neutral flame when the amount of oxygen is roughly equal to the amount of the gaseous fuel mixture, or can be a reducing flame when the amount of oxygen is less than the amount of the gaseous fuel mixture. The oxidizing flames tend to be of the highest temperature (e.g., about 3480° C. (6300° F.)). Neutral flames are often desirable for cutting purposes; however, reducing flames can also be used for cutting such as thin materials where less distortion is desired. Reducing flames, which tend to be the coolest (e.g., about 3200° C. (5800° F.)), are often used for soldering.

Various tips can be used with the torches. The size and shape of the tip are typically selected based on the particular application. For example, for cutting metal, the tip size is usually selected based on the thickness of the metal being cut. Various tips are commercially available from a variety of suppliers such as, for example, PRO-CYL LLC. Torch tips that draw ambient air as the oxygen source are commonly used in the heating and plumbing industry.

The gas cylinder may be equipped with additional safety features. For example, a polymeric sleeve can be positioned around at least a portion of the exterior of the gas cylinder such as around the non-corrosive container. This polymeric sleeve can protect the gas cylinder from become scratched or scraped when positioned adjacent to other gas cylinders.

The gas cylinder can be further equipped with a protective guard around the valve that helps minimize the accidental opening of the valve or that helps minimize the accidental dislodging or removal of the valve in the event that the gas cylinder falls from its upright position. For gas cylinders that are portable, the protective guard can be designed to provide a handle or position for carrying the gas cylinder.

In another aspect, an article is provided that includes a gaseous fuel mixture and a refillable gas cylinder. The gaseous fuel mixture comprises (a) hydrogen in an amount in a range of 70 to 95 volume percent based on a total volume of the gaseous fuel mixture, (b) methane in an amount in a range of 5 to 30 weight percent based on the total volume of the gaseous fuel mixture, and (c) a mercaptan compound in an amount less than 0.1 to 100 parts per million (volume/volume). The gas cylinder has (a) a non-corrosive container comprising aluminum and (b) a valve that is connected to the non-corrosive container and that is suitable for use with a hydrogen-containing gas. The gaseous fuel mixture is positioned within the non-corrosive container of the gas cylinder.

The gas cylinders are often refillable, recyclable, lightweight (e.g., lighter than steel or other commonly used gas cylinders), and non-corrosive. The gaseous fuel mixture is environmentally friendly.

In yet another aspect, an environmentally friendly heating method is provided. The method includes providing a refillable gas cylinder having a non-corrosive container and a valve that is connected to the non-corrosive container and that is suitable for use with a hydrogen-containing gas. The method further includes at least partially filling the non-corrosive container of the gas cylinder with a gaseous fuel mixture that contains both hydrogen and methane. Hydrogen is present in the gaseous fuel mixture in an amount in a range of 30 to 95 volume percent based on a total volume of the gaseous fuel mixture. Methane is present in the gaseous fuel mixture in an amount in a range of 5 to 70 volume percent based on the total volume of the gaseous fuel mixture. The method yet further includes supplying a heating source, wherein supplying includes discharging at least a portion of the gaseous fuel mixture from the non-corrosive container of the gas cylinder through the valve and combining the gaseous fuel mixture with an oxygen-containing gas. After discharging, the method still further includes adding additional gaseous fuel mixture to the non-corrosive container of the gas cylinder through the valve.

In this method, the gas cylinder is the same as described above. Additionally, the gaseous fuel gas mixture is the same as described above. The gas cylinder is designed such that it can be refilled multiple times. That is, the gaseous fuel mixture initially introduced into the gas cylinder can be used as a heating source upon being discharged from the gas cylinder and combined with an oxygen-containing gas. After discharging, additional gaseous fuel mixture can be introduced into the gas cylinder to replace the gaseous fuel mixture that was discharged. This newly introduced gaseous fuel mixture can subsequently be used as a heating source. The charging (i.e., introduction of gaseous fuel mixture into the gas cylinder) and discharging (i.e., removal of gaseous fuel mixture from the gas cylinder) steps may occur multiple times. For example, the charging and discharging steps can occur at least 10 times, at least 20 times, at least 50 times, or at least 100 times, so long as adequate safety testing is performed on the gas cylinders and the gas cylinders continue to satisfy the appropriate safety standards.

The gaseous fuel mixture generates heat when mixed with an oxygen-containing gas and combusted. The combustion reaction generates heat and allows the gaseous fuel mixture to function as a heat source. The heat source can be used to perform a variety of non-welding metallurgical tasks such as heating metal, cutting metal, brazing metal, soldering metal, flame spraying, and the like. The heat source also can be used under appropriate conditions for cooking purposes (e.g., with a stove or grill) or for providing heat to a space such as a room.

In one example, the combination of gaseous fuel mixture and oxygen is used as a heating source for cutting metal. This refers to severing the metal. Specialized cutting torch heads are typically used. Currently, cutting is often performed using acetylene. Acetylene cutting tends to be dirty, and the cutting tip is especially susceptible to becoming clogged with debris. The gaseous fuel mixture described herein tends to burn cleaner than acetylene and is more desirable where contamination of the metal that is being cut needs to be minimized. In some cutting applications, the metal is steel or another ferrous-containing metal.

In other examples, the combination of gaseous fuel mixture and oxygen is used as a heating source for brazing metal or for soldering metal. Brazing and soldering both refer to metal joining processes. A filler metal is usually heated above its melting point and then distributed between two or more close-fitting metal parts by capillary action. The filler metal is often flowed over one part (know as wetting) and then cooled to join the two parts together. The temperature associated with soldering is lower than that associated with brazing. More specifically, the American Welding Society defines soldering as occurring at temperatures below 840° F. (450° C.) while brazing occurs at temperature greater than 840° F. (450° C.). That is, the filler metal used in soldering has a melting point less 840° F. (450° C.) than while the filler metal used for brazing has a melting point greater than 840° F. (450° C.). Suitable filler materials for both soldering and brazing are commercially available from multiple suppliers include, for example, PRO-CYL LLC and from UNITED BLAZING under the trade designation BRAZECRAFT and SOLDERCRAFT. A commonly used brazing filler material is known as Low Fuming Bronze (LFB), which melts at about 880° C. (1620° F.). A commonly used soldering filler material is STAYBRITE 8. With brazing or soldering, the base metal being joined is heated but not to a temperature sufficient to cause melting (i.e., the base metals are not fused together). Steel, for example, melts at about 1150° C. (2100° F.). The color of the brazing filler material is often different than that of the metal parts joined together. The cohesion of the brazing material to the metal parts joined together results in the joint formation.

In still other examples, the combination of gaseous fuel mixture and oxygen is used to heat metal such as pre-heating metal prior to performing various tasks such as brazing, soldering, or cutting. Alternatively, the heating can be coupled with a controlled cooling process to prevent the formation of cracks in metals after being subjected to various high temperature processes.

In yet other examples, the combination of gaseous fuel mixture and oxygen is used as a heating source for flame spraying. Flame spraying refers to a method of coating a metal substrate. The coating material, which is often in the form of a wire or powder of metal or ceramic material, is heated to its melting point and formed into droplets. The droplets are accelerated by high pressure air streams and sprayed onto the surface of the metal substrate.

The gaseous fuel mixture combined with an oxygen-containing gas is typically not a suitable heat source for welding. Unlike the flame produced by the combination of oxygen and acetylene, the flame resulting from the combination of oxygen and the gaseous fuel mixture described herein tends to be fairly uniform in temperature. There is no inner cone region that is as hot as that present in an acetylene flame (i.e., in the blue inner cone region of the acetylene flame). There is no localized region as in the acetylene flame that is hot enough to melt metals such as steel. When used for welding purposes, the joints formed tend to be weak compared to those formed with an acetylene flame.

Even though the flame produced by combustion of the gaseous fuel mixture is not suitable for welding, it is particularly well suitable for many non-welding applications involving the joining of metal parts or the treatment of metal surfaces. The flame produced by the combustion of the gaseous fuel mixture is particularly well suited for non-welding applications such as cutting, brazing, and soldering because of its lower temperature compared to acetylene and because of its cleaner nature than acetylene. The flame tends to be quite uniform in temperature throughout and this uniformity is useful when used in applications where excessive heat can cause damage to the metal being joined.

After the gaseous fuel mixture has been discharged (e.g., partially discharged or completely discharged) from the gas cylinder, the discharged gas cylinder can be returned to the vender or to a refilling station. The vender or the refilling station can then recharge (i.e., refill) the gas cylinder with additional gaseous fuel mixture. In certain embodiments, the exterior of the gas cylinder may include information about the location of these refilling stations or can include a website address with such information. In some instances, the vendor, the refilling station, or both obtains a license from the manufacturer to recharge the gas cylinder with the gaseous fuel mixture.

The refillable nature of the currently described heating sources offer several environmental and safety advantages over commonly used heating sources. For example, using refillable gas cylinders can diminish the number of gas cylinders that end up as solid waste. The non-corrosive nature of the gas cylinders lowers the risk of contamination if residual gaseous fuel mixture remains in gas cylinders or if gas cylinders are disposed of (perhaps accidentally) in an improper manner. When the useful lifetime of the gas cylinder is reached, it can usually be recycled, particularly if it is made of aluminum. This also can lead to reduced solid waste compared to many currently used gaseous heating sources.

The gaseous fuel mixture can be combusted to provide a flame with minimal soot or that is free of soot. A torch containing a mixture of oxygen and the gaseous fuel mixture is typically easy to light. No special torches are needed. That is, industrial standard torches and torch tips can be used without modification.

Additionally, the flame noise is relatively low because of the relatively low flow rates (i.e., the relatively low pressure settings on the regulator) of the gaseous fuel mixtures that are needed to sustain a flame. Lower flow rates tend to correlate with lower noise levels (i.e., lower decibels). For example, to cut a steel plate having a thickness of 2.54 cm (1 inch), a fuel pressure of 34.5 to 68.9 kPa (5 to 10 psi) can be used in combination with an oxygen pressure of 275.6 to 344.5 kPa (40 to 50 psi) to cut at a speed of 35.5 to 50.8 cm per minute (14 to 20 inches per minute). In another example, to cut a steel plate having a thickness of 25.4 cm (10 inches), a fuel pressure of 68.9 to 103.4 kPa (10 to 15 psi) can be used in combination with an oxygen pressure of 413.4 to 482.3 kPa (60 to 70 psi) to cut at a speed of 10.2 to 15.2 cm per minute (4 to 6 inches per minute).

Various items are provided that are articles or method of heating.

Item 1 is an article is provided that includes a gaseous fuel mixture and a refillable gas cylinder. The gaseous fuel mixture comprises (a) hydrogen in an amount in a range of 30 to 95 volume percent based on a total volume of the gaseous fuel mixture and (b) methane in an amount in a range of 5 to 70 weight percent based on the total volume of the gaseous fuel mixture. The gas cylinder has (a) a non-corrosive container and (b) a valve that is connected to the non-corrosive container and that is suitable for use with a hydrogen-containing gas. The gaseous fuel mixture is positioned within the non-corrosive container of the gas cylinder.

Item 2 is the article of item 1, wherein the gaseous fuel mixture comprises 75 to 95 volume percent hydrogen and 5 to 25 volume percent methane.

Item 3 is the article of item 1 or 2, wherein the gaseous fuel mixture comprises 85 to 95 volume percent hydrogen and 5 to 15 volume percent methane.

Item 4 is the article of any one of items 1 to 3, wherein the gaseous fuel mixture further comprises a mercapto-containing compound.

Item 5 is the article of item 4, wherein the mercapto-containing compound is methyl mercaptan.

Item 6 is the article of any one of items 1 to 5, wherein the non-corrosive container comprises aluminum or an aluminum alloy.

Item 7 is the article of any of one of items 1 to 6, wherein the gas cylinder further comprises polymeric sleeve arranged on a portion of container.

Item 8 is the article of any one of items 1 to 7, wherein the fuel mixture is free or essentially free of acetylene, acetone, dimethyl formamide, N-methylpyrrolidinone, or mixtures thereof.

Item 9 is the article of any one of items 1 to 8, wherein the fuel mixture is free or essentially free of a solid filler material.

Item 10 is the article of any one of items 1 to 9, further comprising a protective guard surrounding the valve, wherein the protective guard is configured for use as a handle for carrying the gas cylinder.

Item 11 is the article of any one of items 1 to 10, wherein the valve is suitable for discharging the fuel mixture and for refilling the gas cylinder with additional fuel mixture after discharging.

Item 12 is the article of any one of items 1 to 11, further comprising a gas regulator and a torch suitable for cutting metal, brazing metal, or soldering metal, wherein the regulator has a first end connected to the valve and a second end connected to the torch.

Item 13 is the article of item 12, further comprising a gas cylinder containing an oxygen-containing gas connected to the torch.

Item 14 is a method of heating that can be environmentally friendly. The method includes providing a refillable gas cylinder having a non-corrosive container and a valve that is connected to the non-corrosive container and that is suitable for use with a hydrogen-containing gas. The method further includes at least partially filling the non-corrosive container of the gas cylinder with a gaseous fuel mixture that contains both hydrogen and methane. Hydrogen is present in the gaseous fuel mixture in an amount in a range of 30 to 95 volume percent based on a total volume of the gaseous fuel mixture. Methane is present in the gaseous fuel mixture in an amount in a range of 5 to 70 volume percent based on the total volume of the gaseous fuel mixture. The method still further includes supplying a heating source, wherein supplying includes discharging at least a portion of the gaseous fuel mixture from the non-corrosive container through the valve and combining the gaseous fuel mixture with an oxygen-containing gas. After discharging, the method yet further includes adding additional gaseous fuel mixture to the non-corrosive container through the valve.

Item 15 is the method of item 14, further comprising using the heating source to heat metal for a non-welding application.

Item 16 is the method of item 15, wherein the non-welding application is cutting, brazing, soldering, flame spraying, or a combination thereof.

Item 17 is an article is provided that includes a gaseous fuel mixture and a refillable gas cylinder. The gaseous fuel mixture comprises (a) hydrogen in an amount in a range of 70 to 95 volume percent based on a total volume of the gaseous fuel mixture, (b) methane in an amount in a range of 5 to 30 weight percent based on the total volume of the gaseous fuel mixture, and (c) a mercaptan compound in an amount less than 0.1 to 100 parts per million (volume/volume). The gas cylinder has (a) a non-corrosive container comprising aluminum and (b) a valve that is connected to the non-corrosive container and that is suitable for use with a hydrogen-containing gas. The gaseous fuel mixture is positioned within the non-corrosive container of the gas cylinder.

Item 18 is an article of item 17, wherein the gaseous fuel mixture comprises 85 to 95 volume percent hydrogen and 5 to 15 volume percent methane.

Item 19 is an article of item 17 or 18, further comprising a gas regulator and a torch suitable for cutting metal, brazing metal, or soldering metal, wherein the regulator has a first end connected to the valve and a second end connected to the torch.

Item 20 is the article of item 19, further comprising a gas cylinder containing an oxygen-containing gas connected to the torch.

Item 21 is the article of any one of items 17 to 20, wherein the gas cylinder is recyclable, and lightweight and wherein the gaseous fuel mixture is environmentally friendly.

Item 22 is a method of using the article of any one of items 1 to 13 or items 17 to 21 for heating metal, brazing metal, or a combination thereof.

Item 23 is the method of item 22 wherein the heating metal, brazing metal, or a combination thereof is performed on component of a heating, ventilation, or air conditioning system.

Item 24 is the article of any one of items 1 to 13 or items 17 to 21, wherein the gas cylinder has a diameter of 7.6 cm (3 inches) to 15.2 cm (6 inches).

EXAMPLES

Example 1

Cutting

A gaseous fuel mixture containing 90 volume percent hydrogen and 10 volume percent methane was used in combination with oxygen for cutting. The oxygen was dispensed at a rate of 30 cubic feet per hour and the gaseous fuel mixture was dispensed at a rate of 2 cubic feet per hour. The torch had a SMITH #1 tip. A sample of 0.5 inch thick A-36 mild steel plate was cut at a rate of 24 inches per minute using the torch.

The gaseous fuel mixture burned cleanly (i.e. without creating soot and carbon buildup), and exhibited a smooth transitional shutdown without popping or flashback.

Example 2

Brazing

A gaseous fuel mixture containing 90 volume percent hydrogen and 10 volume percent methane was used in combination with oxygen for brazing. The oxygen was dispensed at a rate of 30 cubic feet per hour and the gaseous fuel mixture was dispensed at a rate of 2 to 3 cubic feet per hour. The torch had a SMITH MW205 braze tip.

Two steel coupons (low carbon content, SAE 1018 steel) were joined by brazing. The brazing rod was a Low Fuming Brazing (LFB) rod. The steel coupons were heated to a cherry red color. The brazing rod was melted to join the two steel coupons together. That is, the molten blazing rod material flowed over the two coupons and joined them together by molecular surface cohesion. The color of the brazing was different than the color of the steel coupons.

The gaseous fuel mixture burned cleanly (i.e. without creating soot and carbon buildup), and exhibited a smooth transitional shutdown without popping or flashback.

Comparative Example 1

Welding with Gaseous Fuel Mixture

A gaseous fuel mixture containing 90 volume percent hydrogen and 10 volume percent methane was used in combination with oxygen for welding. Both gases, the gaseous fuel mixture and compressed oxygen, were dispensed at a rate of 20 cubic feet per hour to provide a neutral flame. A standard welding tip (SMITH torch with a standard 205 mixer tip) was used.

A 70 S2 wire was used as the welding rod or filling material. 70 S2 wire is commonly used for welding and contains a copper coating around a carbon steel core. The copper coating acts as a protective barrier against oxidization from ambient environment such as air and also acts as an agent that promotes better flow of material, or "puddling". The melting point and the tensile strength of the welding rod are comparable to that of the two steel coupons described below.

Two steel coupons (low carbon content, SAE 1018 steel) were placed side by side, with one edge of each coupon in contact with the other coupon. The 70 S2 wire melted slowly but did not flow in a satisfactory manner because of the relatively low flame temperature. That is, there no puddles of the molten material formed. The temperature was insufficient to create a bead of the 70 S2 wire on the surface of the steel coupons. After welding, the coupons fell apart when the joined part was bent slightly due to the low weld or joint strength. Stated differently, there was a lack of fusion of the two coupons together and a lack of penetration. Further, high levels of sparking suggested that there may be hydrogen embrittlement.

Comparative Example 2

Welding with Acetylene

The gaseous fuel mixture of Comparative Example 1 was replaced with acetylene. The oxygen/acetylene flame was neutral. Two steel coupons were welded in the same manner as described in Comparative Example 1. The 70 S2 wire melted and flowed sufficiently well to form puddles of the molten material. A strong weld resulted. When the joined coupons were bent such that the ends of the coupons opposite the weld touched each other, the weld did not break.

What is claimed is:

1. A method for heating, the method comprising
A) providing a refillable gas cylinder comprising a non-corrosive container and a value that is connected to the non-corrosive container and that is suitable for use with a hydrogen-containing gas; wherein the refillable gas cylinder contains a gaseous fuel mixture comprising:
  (a) hydrogen in an amount in a range of 30 to 95 volume percent based on a total volume of the gaseous fuel mixture; and
  (b) methane in an amount in a range of 5 to 70 volume percent based on a total volume of the gaseous fuel mixture; and
B) supplying a heating source, wherein supplying comprises discharging at least a portion of the gaseous fuel mixture from the non-corrosive container through the valve and combining the gaseous fuel mixture with an oxygen containing gas;
wherein the gaseous fuel mixture burns without creating soot or carbon buildup.

2. The method of claim 1, wherein the gaseous fuel mixture comprises 75 to 95 volume percent hydrogen and 5 to 25 volume percent methane.

3. The method of claim 1, wherein the gaseous fuel mixture comprises 85 to 95 volume percent hydrogen and 5 to 15 volume percent methane.

4. The method of claim 1, wherein the gaseous fuel mixture further comprises a mercapto-containing compound.

5. The method of claim 4, wherein the mercapto-containing compound is methyl mercaptan.

6. The method of claim 1, wherein the non-corrosive container comprises aluminum or an aluminum alloy.

7. The method of claim 1, wherein the gaseous fuel mixture is free or essentially free of acetylene, acetone, dimethyl formamide, N-methylpyrrolidinone, or mixtures thereof.

8. The method of claim 1, wherein the gaseous fuel mixture is free or essentially free of a solid filler material.

9. The method of claim 1, wherein the valve is suitable for discharging the fuel mixture and for refilling the gas cylinder with additional fuel mixture after discharging.

10. The method of claim 1, wherein the heating does not include welding metallurgical applications.

11. The method of claim 1, wherein the heating is selected from one or more of the group consisting of: heating metal, cutting metal, brazing metal, soldering metal, flame spraying, cooking, and providing heat to a space.

12. The method of claim 1, wherein the gas cylinder further comprises a gas regulator and a torch suitable for cutting metal, brazing metal, or soldering metal, wherein the regulator has a first end connected to the valve and a second end connected to the torch.

13. The method of claim 12, wherein the oxygen containing gas is contained in a separate gas cylinder and is connected to the torch.

14. The method of claim 1, wherein the gaseous fuel mixture comprises less than 500 parts per million carbon monoxide.

15. The method of claim 1, wherein at least 99.3 volume percent of the gaseous fuel mixture is hydrogen and methane.

16. A method for cooking, the method comprising
A) providing a refillable gas cylinder comprising a non-corrosive container and a value that is connected to the non-corrosive container and that is suitable for use with a hydrogen-containing gas; wherein the refillable gas cylinder contains a gaseous fuel mixture comprising:
  (a) hydrogen in an amount in a range of 30 to 95 volume percent based on a total volume of the gaseous fuel mixture; and
  (b) methane in an amount in a range of 5 to 70 volume percent based on a total volume of the gaseous fuel mixture; and
B) supplying a heating source, wherein supplying comprises discharging at least a portion of the gaseous fuel mixture from the non-corrosive container through the valve and combining the gaseous fuel mixture with an oxygen containing gas.

17. The method of claim 16, wherein the cooking is performed on a grill.

18. The method of claim 16, wherein the gaseous fuel mixture comprises 75 to 95 volume percent hydrogen and 5 to 25 volume percent methane.

19. The method of claim 16, wherein the gaseous fuel mixture comprises 85 to 95 volume percent hydrogen and 5 to 15 volume percent methane.

20. The method of claim 16, wherein at least 99.3 volume percent of the gaseous fuel mixture is hydrogen and methane.

* * * * *